United States Patent
Ng et al.

(10) Patent No.: US 7,468,820 B2
(45) Date of Patent: Dec. 23, 2008

(54) PROFILE CREATION FOR TEXTURE SIMULATION WITH CLEAR TONER

(75) Inventors: Yee S. Ng, Fairport, NY (US);
Hwai-Tzuu Tai, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 661 days.

(21) Appl. No.: 11/062,417

(22) Filed: Feb. 22, 2005

(65) Prior Publication Data

US 2006/0187505 A1    Aug. 24, 2006

(51) Int. Cl.
*G03F 3/08* (2006.01)
*H04N 1/46* (2006.01)
*H04N 1/60* (2006.01)
*G06F 15/00* (2006.01)
*G06K 1/00* (2006.01)
*G06K 9/00* (2006.01)

(52) U.S. Cl. ........... 358/518; 358/1.9; 358/534; 358/536; 382/167

(58) Field of Classification Search ........ 358/500, 358/518, 1.1, 1.9, 3.06, 3.2, 3.28, 534, 536
See application file for complete search history.

(56) References Cited

U.S. PATENT DOCUMENTS

| | | | |
|---|---|---|---|
| 4,493,539 A * | 1/1985 | Cannon, Jr. .......... | 351/205 |
| 4,621,287 A * | 11/1986 | Reitmeier et al. ........ | 348/436.1 |
| 5,234,783 A | 8/1993 | Ng ............... | 430/45 |
| 5,767,978 A * | 6/1998 | Revankar et al. ........... | 358/296 |
| 5,804,341 A * | 9/1998 | Bohan et al. ................. | 430/12 |
| 5,915,144 A * | 6/1999 | Ide et al. ................... | 430/45.3 |
| 6,035,103 A * | 3/2000 | Zuber ......................... | 358/1.9 |
| 6,091,851 A * | 7/2000 | Acharya ..................... | 382/167 |
| 6,628,826 B1 * | 9/2003 | Gilman et al. ............. | 382/167 |
| 7,197,181 B1 * | 3/2007 | Cote .......................... | 382/164 |
| 2002/0018228 A1 * | 2/2002 | Torigoe ..................... | 358/1.14 |
| 2002/0054319 A1 * | 5/2002 | Maekawa et al. ......... | 358/1.15 |
| 2002/0080186 A1 * | 6/2002 | Frederiksen ................ | 345/808 |
| 2002/0136445 A1 * | 9/2002 | Haikin et al. ............... | 382/162 |
| 2004/0174548 A1 * | 9/2004 | Ono .......................... | 358/1.9 |
| 2005/0135851 A1 * | 6/2005 | Ng et al. .................... | 399/341 |

* cited by examiner

*Primary Examiner*—Mark K Zimmerman
*Assistant Examiner*—Ming Hon
(74) *Attorney, Agent, or Firm*—Lawrence P. Kessler

(57) ABSTRACT

A system and method for selective color-correction when applying three-dimensional texture to a printed substrate hinges either on a metric that is elicited from the image, or as determined by an operator. The metric may be associated with the human visual acuity curve for textural information. Other textural metrics may also be used.

20 Claims, 13 Drawing Sheets

PROFILE CREATION FOR TEXTURE SIMULATION WITH CLEAR TONER

CROSS-REFERENCE TO RELATED APPLICATIONS

This application is related to U.S. patent application Ser. No. 11/063,063, filed on even date herewith, by W. Charles Kasiske et al., entitled: "System and Method for Creating a Three-Dimensional Texture in an Electrophotographic Image". This application is also related to U.S. patent application Ser. No. 10/836,603, filed on Apr. 30, 2004, by Yee S. Ng, entitled: "Color Correction Method With Transparent Toner Insignia Images". The foregoing applications are all incorporated by reference.

FIELD OF THE INVENTION

The present invention relates generally to a method and system for using clear toner to impart texture to a printed image in a printing process.

BACKGROUND OF THE INVENTION

Electrophotographic Printers

FIG. 1a shows a prior art electrophotographic (EP) printer 10, such as the NexPress® 2100. Printer 10 includes five imaging units (also referred to as development stations or electrostatographic image-forming modules) 20C, 20M, 20Y, 20K, and 20X. These stations are generally arranged in tandem and are shown in FIG. 1a in a specific arrangement with cyan, magenta, yellow, black, and a fifth station in order. Each station includes elements that are similar from station to station and are shown in FIG. 1a to have similar referenced numerals with a suffix of C, M, Y, and K to refer to the station to which such element is respectively associated. Since each station is identical in construction, the specific elements specified herein are shown in FIG. 1a at one station only, but should be understood to apply in like manner to each station. Each station includes a primary image-forming member, for example, a drum or roller, 22. Each roller 22 has a respective photoconductive surface 24 having one or more layers upon which an image or a series of images is formed. To form a toned image, the outer surface of the rollers 22 are uniformly charged by a primary charger such as a corona charging device 26, or by any other suitable charger such as a roller charger, a brush charger, etc. The uniformly charged surface 24 is typically exposed by a image writer or exposure device 28, which is generally an LED or other electro-optical exposure device. Any alternative exposure device may be used, such as an optical exposure device to selectively alter the charge on the surface 24 of the roller 22. The exposure device 28 creates an electrostatic image that corresponds to an image to be reproduced or generated. This electrostatic image is developed by applying marking particles to the latent image on the photoconductive drum 22 by a toner developing station 30. Each toner development station 30 is associated with a particular type of toner marking particle and magnetic carrier particle, which is typically in a preferred toner concentration and is attracted by a certain voltage supplied by a power supply (not shown). The image is transferred onto a transfer drum 32. After the transfer is made from the photoconductive drum 22, the residual toner image is cleaned from the surface 24 of the drum 22 by a suitable cleaning device 34. The cleaning device 34 then prepares the surface 24 of the drum 22 for reuse to form subsequent toner images. The intermediate or transfer drum 32 likewise is coated by a transfer surface 36, which can include one or more layers. The intermediate transfer drums 32 are each cleaned by respective cleaning devices 44 to prepare the transfer drums for reuse.

The imaging units 20C, 20M, 20Y, 20K, and 20X generally are in contact with a transport device, such as the shown endless belt or web 38, which can include receiver members adhered thereto such as paper or other media 15 that is to receive the image. In the alternative, the belt or web provided should not be restricted to the belt or web shown in FIG. 1a since the image transfer can be made on any suitable surface capable of receiving paper or other media as it passes between the imaging units. The web 38 can also detachably retain the paper electrostatically or by mechanical devices such as grippers. Typically, receiver members are electrostatically adhered to belt 38 by the deposit of electrostatic charges from a charging device, such as, for example, by using a corona charger 40. A sheet of paper 15 is shown in FIG. 1a proceeding along the belt 38 through each of the five imaging stations.

As shown in FIG. 1a, the transfer drum 32 interacts with the paper 15 along the belt 38 to transfer the electrostatic image from the transfer surface 36 of the transfer drum 32. The paper 15 then proceeds through each developing station. Once the paper 15 has passed through each imaging unit 20, the paper 15 proceeds to a detack charger 42 to deposit a neutralizing charge on the paper 15 to separate the paper 15 from the belt 38. The paper 15 proceeds past the detack charger 42 and is transported to a remote location for operator retrieval. The transfer of images in each imaging unit 20C, 20M, 20Y, 20K, and 20X are performed without the application of heat to negate any fusing or sintering of toner images transferred to the paper 15 until the paper 15 enters a fuser 46 downstream. The paper 15 utilized herein can vary substantially in thickness and it is contemplated that this paper should not be limiting in any manner. For example, the paper can be thin or thick, include various paper stocks, transparencies stock, plastic sheet materials, and foils.

Although not shown, appropriate sensors of any well-known type, such as mechanical, electrical, or optical sensors, for example, generally are utilized in the printer to provide control signals for the printer. Such sensors may be located along the paper travel path, including along the belt 38, between the paper supply, and through the imaging units and the fusing station. Additional sensors may be associated with the photoconductive drums, the intermediate drums, any transferring mechanisms, and any of the image processing stations. Accordingly, the sensors can be provided to detect the location of the paper through its travel path in relation to each of the imaging units and can transmit appropriate signals indicative of the paper location. Such signals are input into a logic and control unit (not shown), which can include a microprocessor. Based on such signals and on the microprocessor, the control unit can output signals to the printer to control the timing operations of the various development stations or imaging units to process images and to control a motor (not shown) that drives the various drums and belts.

An electrophotographic system may include a front-end station 150 that is coupled either by wired, or wireless, connection, to the electrophotographic (EP) printer 10. As seen in FIG. 1b, the front-end station 150 may include a scanner 152 having a scanning head 154 for scanning documents. In addition, the front-end station has a personal computer or the like, including a display 156, a keyboard 158 and a pointing device, such as a mouse 160 or the like, to interface with an operator. The front-end station may be a unit that is separate and distinct from the electrophotographic (EP) printer, as shown in FIG. 1a, or it may be part stand-alone unit. Software in the front-end station allows one to receive and edit job tickets, print process information, print content information, and the like.

Color Models

Various color models are used in the printing industry in conjunction with an electrophotographic (EP) printer.

The RGB (red/green/blue) color model is based on adding light, i.e., colors are created by emitting red, green, and blue beams of light. In the RGB color model, pixel colors can be changed by combining various values of red, blue, and green. Each primary color has a range of values from 0 to 255. Thus, with 256 possible values of each primary color, the total number of possible colors is approximately 16.7 million.

Printing technology uses a combination of cyan, magenta, yellow, and black inks that reflect and absorb various wavelengths of light. Colors created by overprinting these four colors are part of the CMYK color model. The CMYK color model is the basis for four-color process printing, to print continuous tone images on a commercial printer. In four-color process printing, colors are reproduced on a commercial printer by using four different plates: cyan, magenta, yellow, and black. By combining inks of cyan, magenta, and yellow, a commercial printer can reproduce a significant portion of the visible spectrum of colors.

The L*a*b (or CIE L*a*b) color model provides for creating consistent, device-independent color, so that colors should not vary regardless of the monitor or printer used. The L*a*b color model is based on changes in a color's lightness (L* values from 0 to 100), an "a*" axis of colors ranging from green to magenta, and a "b*" axis of colors ranging from blue to yellow. In the description that follows, perceptual space refers to the human perceptual space. The International Commission on Illumination (CIE Commission Internationale de l'Eclairage) has attempted to create a uniform color space so that an equal color difference (deltaE) in one color region can have a similar perceptual difference in another color region.

Color perception is a sensory perception triggered by the color in the brain of an observer. Describing the color has two components: a chromatic stimulus, which is the measurable radiation reflected by an observed body; and a color stimulus specification, which is the result of the visual perception in the eye of the observer.

The gamut is a term in the art for the visible color range of a color model. For example, the gamut of RGB color model is larger than that of CMYK color module. The L*a*b color gamut encompasses the color gamuts of both RGB and CMYK. Typical printing processes include four-color imaging units or modules having ink or toner of standard colors such as cyan, magenta, yellow, and black which represent the CMYK color model. These four imaging units are capable of printing a color gamut that includes most of the colors that are required by customer print job orders.

Color Correction In The Presence of Clear Toner

The fifth imaging unit may be provisioned with clear toner, which can be applied in quantities between 0%-100% of some maximum toner quantity (the lay down), on a per-pixel basis. The quantity of clear toner applied may be a binary value, i.e., each pixel receiving either 0% or 100% in toner quantity. Alternatively, the quantity of clear toner applied may be a non-binary, or continuous value, i.e., each pixel receiving an amount ranging from 0% or 100% of the maximum toner quantity. In either case, the quantities are specified in the image file's layer for the clear toner.

The problem with placing clear toner on top of other color toners in a one-step fusing process is that wherever the clear toner lands on the substrate, it changes the flow of the color toner below when it melts. Consequently, the color below the clear toner is not the same as the color of other portions of the substrate that do not have a clear toner on top. With the color toner below the clear toner being a halftone dot structure, the problem in matching colors between the portions of the substrate that do and do not have clear toner on top, becomes a complicated process. The image below the clear toner contains four separate layers and this continuous layer structure is a halftone dot structure. Different sized halftones combine to produce the illusion of continuous tones of gray and color. Thus, when clear toner is used on top of the color image, the color below the clear toner will be affected depending on the amount of clear toner lay down, paper substrate type, and amount of underlying color toners as well as the fusing condition.

If the clear toner is used over the whole color image, then a new color profile can be generated for that image under coverage by the clear toner layer (with either full coverage or inverse mask coverage).

If, however, the clear toner is used only over a portion of the image, then the color below the clear toner is different than that on the adjacent region without clear toner when the same color profile is used for the color toner image, and this can be distracting for the viewer. Therefore, methods have been developed so that the color under the clear toner is similar to color adjacent to it.

FIG. 2 shows a color gamut comparison for a color image, with and without use of a clear toner. This figure shows the effect of the clear toner, having similar viscosity to the four other color toners, on the color gamut of the four-color image below the clear toner layer. The separate plots represent the color gamut cross-section, with and without clear toner, for lightness values in the L*a*b color space that range from L* of 10 to L* of 90 in increments of 10 units. In this particular case of toner/substrate/roller fusing combination, the color gamut was reduced with the addition of clear toner on top. The maximum coverage is ~0.45 mg/cm$^2$ for 100% clear toner as shown here.

FIG. 3 shows the color error histogram of the in-gamut color, with respect to the four-color image, between the four-color process and the four-color plus clear toner process in the CIE color space. The numerical value for the difference between two colors in a color classification system is indicated by deltaE. DeltaE76 on the abscissa refers to the refined CIE color model standardized in 1976 and referred to as CIE L*a*b.

Since the color profile for both profile A (four-color process) and profile B (four-color process plus clear toner) can be built for the process conditions mentioned, the desired profile B can be used for the four-color image below the region where the transparent toner is placed. Likewise, for the region where the four-color image does not have the clear toner on top, profile A can be used for the four-color image. Consequently, better color matching can be obtained between the region that has a clear toner on top and the adjacent region where there is no clear toner on top.

Color management is the calibration of all input and output devices within an image processing chain in order to obtain the desired color independently of the devices used. Color management ensures that optimum color reproduction occurs regardless of the input device, monitor and output device used, as long as the device is characterized by an International Color Consortium (ICC) profile. The color management process involves several steps: (1) converting the color values of the input device into device-independent color values; (2) establishing the process for outputting the image; and (3) converting the color values of the image into process-specific output values (e.g., CMYK) with the assistance of the color profile of the output process. Color profile represents a numerical connection between the values of the image input or output device and the CIE color values XYZ or L*a*b. The color profiles produced for the input or output device are device specific and are also determined by the operating conditions of the device and its calibration.

FIG. 4 shows a typical color management module (CMM) for a profile A operation, in which the input data can have the different types of color space use (e.g., from DeviceGray, DeviceRGB, DeviceCMYK, etc). In the output color space, profile A could be for a CMYK output space. The target profile transformation from L*a*b color to Data color space is tuned for the transformation from the L*a*b color space to the four-color CMYK process output color space. In a similar five color operation with clear toner as the fifth imaging module where clear toner is applied on top of the four-color toner, the target profile transformation for profile B is now different in order to map to the CMYK space and create a similar color as in profile A with the same output color adjustment input.

There are several ways to combine the outputs from these two color profiles based on whether or not there is clear toner on top. FIG. 5 illustrates one of these methods with an image band processing system. In this case, the image data includes the clear toner separation 520 and the input color data 510 (e.g., from DeviceRGB, DeviceCMYK, etc.) that are buffered in input image band buffers 540. The image band buffer data are processed through the CMM profiles A and B indicated in FIG. 5 by blocks 550, 560, respectively. The processed image data (e.g., CMYK data) is stored in output image band buffers 570, 580 for each profile. The CMM processing for profiles A (block 550) and B (block 560) can be performed either sequentially or in parallel. Then the CMYK output data for profile A (block 570) and for profile B (block 580) go through an output CMYKF selector and buffer 590. The clear (F) toner input band buffer data (block 530) is used to select which one of the output CMYK signals 595, either profile A (block 570) or profile B (block 580), at the per pixel level to send to the output printing unit with the clear toner signal on the fifth imaging module.

In the case where the color image with the transparent clear toner on top (i.e., profile B) exhibits lower saturation than the color image without the clear toner on top (i.e., profile A), and with a similar output CMYK signal, the full output range can be used in building profile B. The full output range would be 0-255 in a gray level printing system for the CMYK separations. Gray scale values are 8-bit images representing up to 256 shades of gray. In the case of profile A, a profile will need to be created that utilizes less than the full output range. For example, 0-220 could be used in a gray level printing system for the CMYK separations.

In the calibration step for profile building, the output L*a*b value of these two processes with the same RGB input value can be matched. Another way to approach this problem is to map profile A with the full range of gray values (0-255) but load a different L*a*b to L*a*b transformation in four-color printing when a fifth clear toner image data is present and the color compensation function is selected. Therefore, color matching between four-color areas with and without clear toner on top can be achieved. This function can of course be switched off, when the transparent toner for the three-dimensional texture is being printed in an area of no color toner at all in the whole image, or when color matching is not desired in a certain region that will need a flag (a separate input) to identify that region in the output selector block. Then the steps of band buffering and processing are repeated until the image processing is completed. In order not to lose color saturation in a four-color process the 0-255 gray value signals can be supersaturated so that the 220 gray value signals will still produce a saturated color as in a normal four-color printing process. Saturation represents the amount of chroma present in a color.

Another implementation of this color correction method is to create tags, using the information from the clear toner image data, and inserting tag data with the input color data. Within the CMM model illustrated in FIG. 4, multiple color transformations that respond to different colors and tags can be created. Thus, the color mapping with and without the clear toner on top can be processed in one step to output data to the print head electronics.

The clear toner level can vary from 0% to 100% on a per pixel basis. Thus, the clear toner can be of varying gray level (e.g., from 0 to 255 as an 8-bit digital value, or from 0% to 100% in clear toner coverage).

For different clear toner lay down/media/fusing choices, different color profiles (e.g., profile B) can be created as companions to the regular profile (e.g., profile A), so that the color of the image with clear toner on top, of different amounts, can be matched to the four-color image without clear toner, but with different gloss levels. There are several variation of this embodiment that support multiple profiles for different colors/gloss that can be run on the same page.

In a color management model, there are certain color mapping intents for color profiles. One of the mapping intents is referred to as a perceptual intent. What this means is that the color management model is attempting to make a picture look good perceptually. Typically, exact color reproduction is not preferred. There are several reasons for this. For example, consider the situation where the printer output gamut is small compared with the real world. If exact color reproduction is desired, then the out of gamut colors in some hue angle will look the same for each color. In other words, there is no distinction between the colors and the pictures will look bad with the saturated colors all being clipped. Therefore, perceptual intent results in mapping of a color not exactly, but "pleasingly". On the other hand, for exact color reproduction, absolute colorimetric intent is chosen to have accurate color reproduction.

Within a color model, an input color space (e.g., device RGB) can be linked to an output color space (e.g., CMYK separations for printing) via color profiles. The device RGB input can have different objects such as an RGB image and RGB graphics. The color profiles for those different interpretations of color space and objects are used by the color management system to map the input color space (i.e., RGB and object type) to an output color space (CMYK). When usage of the color management model is selected, the user can also specify the intent. For an RGB image, the user can use perceptual intent. For RGB graphics, the user can use absolute colorimetric intent. Thus, the process includes treating the input images as one object, mapping the input images through the perceptual intent of one profile first, to get a L*a*b output, and taking that L*a*b output as an input to another profile. In this case, the mapping can be set to absolute calorimetric intent to obtain a CMYK separation output.

Additional information about color management and the production and structure of color profiles can be found in Section 3.2.10 of "Handbook of Print Media: Technologies and Production Methods", Springer-Verlag, Berlin, (2001).

The contents of this handbook, and especially the cited Section are incorporated by reference.

FIG. 6 illustrates band processing color correction for multiple color profiles (i.e., different gray values) on a per pixel basis to accommodate various amounts of clear toner on top of a four-color image. In other words, the clear toner level may not be non-binary, i.e., not applied at 100% levels, in which instance a blending operation can be performed using the two color profiles, i.e., profile A and profile B discussed above. The top layer can represent a plurality of gray values corresponding to each pixel location. In this figure, an RGB image signal 620 is input into the CMM module (block 630) where the input is mapped to the perceptual L*a*b color space. The output L*a*b values of color under the clear toner level (e.g., profile B) is represented in block 640. The intended L*a*b output values are then input to color profiles A (block 650) and B (block 660). As indicated in FIG. 6, block 650 represents the absolute calorimetric intent for color profile A. Likewise, block 660 represents the absolute calorimetric intent for color profile B. The outputs from blocks 650 and 660 are the output CMYK values of color not under clear toner (i.e., no amount of clear toner on top) in block 670, and the output CMYK values of color under the clear toner in block 680. This results in separation A from block 670 and separation B from block 680. Separations A and B are blended in blending block 690 with further input of the clear toner level value 610 at each pixel location. The result of the blending operation, further illustrated in FIG. 7, results in the printer CMYKF data 695 for each pixel in the image.

The blending operation 700 performed by blending block 690 is shown in more detail in FIG. 7. The clear toner level value X 610 is input into the blending processing logic decision block 710 to determine if the clear toner level is binary, i.e., either 0% or 100%. This represents the same binary processing performed in block 590 of FIG. 5. If the clear toner level value is 0% or 100%, then decision block 720 is entered to more specifically determine if the clear toner level value is 0%. A clear toner level value of 0% means that the printer separation data for the pixel location is separation A as indicated in block 730 (four-color process without clear toner). Otherwise, the printer separation data for the pixel location is separation B as indicated in block 740 (corresponding to profile B discussed above).

If the clear toner level value is non-binary, i.e., other than 0% or 100%, then the blending operation is performed as indicated in block 750. As an example, assume the CDI level value is 80%. Then according to the processing logic of block 750, the printer data is a weighting of separation A and separation B such that the printer output data for the pixel location is separation A*1/5+separation B*4/5. Thus, the blending operation performs a linear interpolation between separation A and separation B.

Creation of Three-Dimensional Textures Using Clear Toner

Clear toner may be applied over a CYMK toner layer to create a three-dimensional texture on a printed substrate. Such a three-dimensional texture has a plurality of formations, which may be seen or felt by an observer. The image file includes a clear toner data layer that corresponds to the three-dimensional texture created by the printing process. This clear toner data layer may specify that the texture is binary, in which case the clear toner level is either 0% or 100% on a per-pixel basis. Alternatively, the data file may specify that the texture is non-binary, in which the clear toner level may be anywhere between 0%-100% on a per-pixel basis.

Three-dimensional texture may be created using an electrophotographic (EP) printer having a plurality of imaging units of the sort discussed above. The electrophotographic (EP) printer accepts substrate having two sides, such as a sheet of paper, linen, or the like, and the various imaging units each transfer one color to a side of the substrate. It is understood, however, that the general concept of applying three-dimensional texture using clear toner, can be performed using other printers, as well. For example, a single module unit for making texture on preprinted material, not even necessarily electrophotograhically produced, may be employed. Furthermore, the texture could be printed over inkjet or lithography produced prints, color or black and white.

The textural data may be added to an existing image file. This can be done by either creating an additional image layer, or modifying a pre-existing layer, using an application such as Adobe Photoshop®. This additional image layer would contain the clear imaging data. For example, in an image file having layers corresponding to cyan, magenta, yellow, and black, a fifth image layer corresponding to clear texture, may be added. Alternatively, where a fifth image layer having clear toner already exists, this fifth layer may be modified to include the textural data. The electrophotographic (EP) printer's software would then interpret the additional/modified layer and apply the clear toner, in due course.

FIG. 8 presents a flow chart 800 depicting an embodiment in which texture is added to an existing image file of print content to be printed over a number of pages. It is understood, however, that the number of pages that are to be printed is not critical and even one page would suffice. The image file, which typically has information corresponding to CMYK layers (and also perhaps a fifth, clear layer), is devoid of digital information corresponding to three-dimensional texture.

In step 802, an image file comprising print-content is received at a pre-processing computer. The pre-processing computer preferably is a personal computer running one or more applications, such as the aforementioned Adobe Photoshop®, enhanced by a "texture plug-in" to facilitate use of the present invention.

In step 804, a first page of the print content is displayed on this computer. It is understood here that the original "CMYK" format is converted through known methods into RGB format for display. In step 806, the pre-processing computer receives input from an operator to select a first designated portion of the page where a first texture is to be added. In step 808, the computer displays a menu of textures from a tool bar or the like, permitting the operator to choose which "stock" texture to apply to the selected portion. Alternatively, the operator may be provided with the option of either using the underlying CMYK image data to providing the textural information (a "data driven texture") or creating an entirely new texture. In either case, the height of the textural features in the final print product may also be specified and received by the pre-processing computer. In step 810, the pre-processing computer displays the image with the textural pattern overlaying the designated portion.

As depicted by step 812, the operator is permitted to select additional designated portions and repeat steps 806, 808, and 810, it being understood that different features or portions of the same page may be provided with different textures. At step 814, the information in the image file is updated to reflect the changes to that page. As depicted by step 816, the operator is permitted to select another page and repeat the process until no additional texture remains to be added. The image file is then updated to include the textural data in the new/modified clear layer and is closed. The thus-modified image file may then be subjected to further editing prior to printing.

In a second embodiment, the textural information may be added at the printer level in a manner that is independent of the image file. If, for example, the printer has five modules, of which the first four are for applying the standard CMYK colors and the fifth is designated a "spot color" module, the texture may be added at a scanning station.

FIG. 9 presents a flow chart 900 depicting an embodiment in which texture is added "on the fly" to a scanned page. In step, 902, a color document is scanned to obtain an RBG image. In step 904, the associated computer displays this image and CMYK layers are created in step 906 from the RGB information in a known manner. Next, in step 908, candidate textures to be added to a operator-designated portion of the scanned page are displayed in a pull-down menu, or the like. In step 910, the computer receives one or more texture selections, and creates a spot color layer corresponding to the textural information. In step 912, the CMYK layers created in step 906, along with the newly formed spot color layer are sent to the electrophotographic (EP) printer, which in step 914, prints all five layers.

In one embodiment, an operator is given the option of selecting from among a plurality of candidate textures, but chooses to create an entirely new textural pattern instead. For this, the menu of candidate texture patterns includes options to "create a new texture" or "import a new texture file". When the "create a new texture" option is selected, the display goes into a drawing mode, and the operator is allowed to draw a new texture. The newly drawn texture can be applied to any portion of the image, as determined by the operator. A further option allows the operator to save the new textural pattern and add it to the list of candidate textures for subsequent use. When the "import a new texture file" option is selected, the operator is allowed to identify a file, either on the local computer, a remote computer, and perhaps even specify a URL to import a texture file. Such an imported textural pattern may be saved and added to the list of candidate textures for subsequent use.

In one embodiment that uses an electrophotographic (EP) printer having at least five imaging units, four differently colored toners, e.g., cyan, magenta, yellow, and black (not necessarily in that order), are first applied to a first side of the substrate using four of the imaging units in accordance with digital information applied to the printer for those corresponding colors. The substrate then enters a fifth imaging unit, which is configured to apply clear toner to the first side of the substrate in accordance with the textural data in the fifth layer within the image file. After clear toner is applied to the first side of the substrate, the substrate is presented to a fusing unit for fusing the four colors and clear toner on the first side of the substrate, all at the same time.

In another embodiment that uses an electrophotographic (EP) printer having at least five imaging units, on a first pass of the substrate through the printer, four or five differently colored toners, e.g., cyan, magenta, yellow, black, and blue (when present, and not necessarily in that order), are first applied to the first side of the substrate in accordance with digital information sent to the imaging unit for each corresponding color. On a second pass of the substrate through the printer, one of the five imaging units is replaced, modified, etc. to apply clear toner to the first side of the substrate. During this second pass, null data may be sent to the other four imaging units so that no additional colored toner is applied. After the second pass, the colored and clear toners on the first side of the substrate are subject to fusing. Alternatively, a first fusing operation may be performed after the first pass, and a second fusing may be performed after the second pass.

In yet another embodiment, the clear toner is applied to a first side of the substrate during a first pass of the substrate through the printer, with the remaining imaging units being presented with null data so that no color is printed. In a second pass, four or five colored toners are applied to the same first side of the substrate, thereby imparting image(s) and/or text to the substrate.

In yet another embodiment, only a single color, e.g., black, is applied, and the clear toner is applied on top of the single color. The texture can thus be applied using an electrophotographic (EP) printer having only two imaging units. The single color and the clear toner are then fused, as described above, thereby forming textural patterns on a monochrome image.

The second side of a substrate may also be printed on during an additional pass (or passes) and so three-dimensional textural information may thus be provided on both sides of the substrate.

In all of the foregoing embodiments, the fusing is preferably done with one or more components having smooth surfaces so that they do not impart their own texture to the substrate.

The locations on the substrate at which the texture is applied depends on the texture data. Generally speaking, however, the textural pattern may be applied to the entire printable area of the substrate, or only on a portion of the substrate. As to the latter, the clear toner may be applied only to those image regions of the substrate at which one or more of cyan, yellow, magenta, and black are to be applied (in case the clear toner is applied first), or have already been applied (in case the clear toner is applied last). Alternatively, the clear toner may be applied only to some, but not all, image regions on the substrate. Another alternative is to apply the clear toner texture only to those non-image regions where none of CMYK have been applied.

Furthermore, the texture data may call for different clear toner textures to be applied to different portions of the substrate. Thus, a first image region on the substrate may receive a first textural pattern, while a second image region on the same substrate may receive a second textural pattern. This allows one to produce a substrate bearing textures of different types on various portions thereof. Thus, for example, one image on the substrate's first side may bear a first texture while a second image on the same side of the substrate may bear a second texture.

The amount of toner applied, and the textural pattern, helps determine the height of the texture features, which, in turn, helps determine the "feel" of the texture. To be both visible and tactilely detectable, sufficient clear toner should be applied when creating a three-dimensional texture. Testing has shown that clear toner quantities on the order of at least 0.5 mg/cm$^2$ are sufficient for this. The upper quantity limit is determined by the capabilities of the electrophotographic (EP) printer-imaging unit and the fusing unit. Generally, however, the clear toner quantity should be less than 5 mg/cm$^2$, and more preferably less than 1 mg/cm$^2$.

To ensure that the textural features are both visible and tactilely detectable, the textural features preferably have a spatial frequency of approximately 50-75 lines/inch, for a "ribbed" or "checkered" pattern. In addition, the textural features preferably have a post-fusing height of at least 0.001 mm relative to the surrounding area, so that they can be felt, upon running a finger over the surface. More preferably, however, this post-fusing height is between 0.003 and 0.010 mm.

It is further noted that texture may also be applied with less than 100% clear toner coverage on a pixel-by-pixel basis to create the textural features. This allows one to create textural formations having varying height. One example of this is when the clear toner is applied in an amount that is data driven. For example, in the embodiment of FIG. 8, at step 806, if a page includes a brushstroke as a feature, the operator may select that brushstroke region as a region to which three-dimensional texture is to be applied in the final printed product. At step 808, the operator may then select that the texture to be applied is "data driven". In such case, the clear toner layer is created based on the data in the CMYK layers for the brushstroke region. In one embodiment, clear toner is applied, pixel by pixel in the brushstroke region, in an amount corresponding to a normalized sum of the amounts in the CMYK layers for the corresponding pixels. This will likely result in the clear layer's brushstroke region having less than 100% clear toner in at least some pixels. Since the textural data for pixels in the brushstroke region are derived from one or more of cyan data, magenta data, yellow data and black data for corresponding pixels in the brushstroke region, the final printed product will then have a feel much like the underlying brushstroke.

While the foregoing parameters are sufficient for visual appreciation of the texture, it is understood that factors such as substrate roughness, lighting, and/or distance from the printed product also influences the ability of a viewer to see the texture.

It is further understood that three-dimensional texture may be applied with clear toner using devices other than the electrophotographic (EP) printer 10 of FIG. 1. For instance, three-dimensional texture may be applied by a device having a single imaging unit provisioned with clear toner and receiving digital information comprising textural data. Such a stand-alone unit may thus be fed substrates, which have previously been printed on with CMYK text and imagery, the clear toner then being applied atop the previously printed-on substrates.

The present invention addresses the problem of how best to mitigate the effect of applying clear toner texture on top of printed color.

SUMMARY OF THE INVENTION

The present invention is directed to a system and method for applying three-dimensional texture to an image. In the present invention, the methodology for applying texture depends on the coarseness of the texture itself.

In one aspect, the present invention is directed to a method of mitigating change in image appearance due to planned application of a three-dimensional texture to a color image to be printed by an electrophotographic (EP) printer. The method entails analyzing digital data including color information for forming an image, the digital data including first information corresponding to a plurality of color layers and second information corresponding to a clear toner layer, the second information sufficient to impart a three-dimensional texture to the image. The method further entails correcting a color profile for the electrophotographic (EP) printer based on a measure of a spatial frequency of said second information.

The nature of the correction depends in large part on the spatial frequency characteristics of the second information. Different approaches are taken, depending on whether the energy of the first information is predominantly at spatial frequencies that are: (a) less than a first threshold frequency, (b) greater than a second frequency that itself is greater than the first frequency, or (c) is between the two frequencies.

An approach to be used when the second information primarily occupies the lower spatial frequencies is to interpolate between a pair of color profiles, based on the amount of clear toner called for in creating a three-dimensional texture on various portions of the final image. In a preferred embodiment, one of the two profiles assumes 100% clear toner coverage over the image, while the second of the two profiles assumes 0% clear toner coverage.

An approach to be used when the second information primarily occupies the higher spatial frequencies is to either only use a profile that assumes no clear toner is to be applied (and accept the changed colors in the image, or permit an operator to create a new profile for the texture to be added to that image.

An approach to be used, when the second information primarily occupies the "middle" spatial frequencies, is to display, as a default, the "interpolation" approach normally used for the lower spatial frequencies while allowing the operator to elect another approach.

The present invention is also directed to an electrophotographic printing system implementing the foregoing.

An advantageous technical effect of the present invention is that the clear toner texture's spatial information is used to selectively determine how best to mitigate the effect of applying a clear toner texture over printed color.

DETAILED DESCRIPTION OF THE INVENTION

The present invention makes use of an electrophotographic (EP) printer of the sort discussed above, and the techniques of color correction in the presence of clear toner, and the creation of three-dimensional textures using clear toner, also discussed above. In particular, the present invention is concerned with color correction in the presence of texture. More particularly, the present invention is concerned with utilizing various approaches to color correction, based on the nature of the texture.

One metric for a two-dimensional texture is its coarseness, which may be determined by a two-dimensional Fourier transform of the clear toner image plane. If a predetermined first percentage "E1" of the textural energy in this image plane is within the lower two-dimensional spatial frequencies, for instance, below a first threshold frequency $f_{1L}$ in the "x"-dimension and below a second threshold frequency $f_{2L}$ in the "y"-dimension, the texture may be considered 'low frequency', or coarse. On the other hand, if a predetermined second percentage "E2" of the textural energy is in the higher two-dimensional spatial frequencies, for instance, above a third threshold frequency $f_{1H}$ in the "x"-dimension and above a fourth threshold frequency $f_{2H}$ in the "y"-dimension, then the texture may be considered to be predominantly 'high frequency'.

Figure 10:
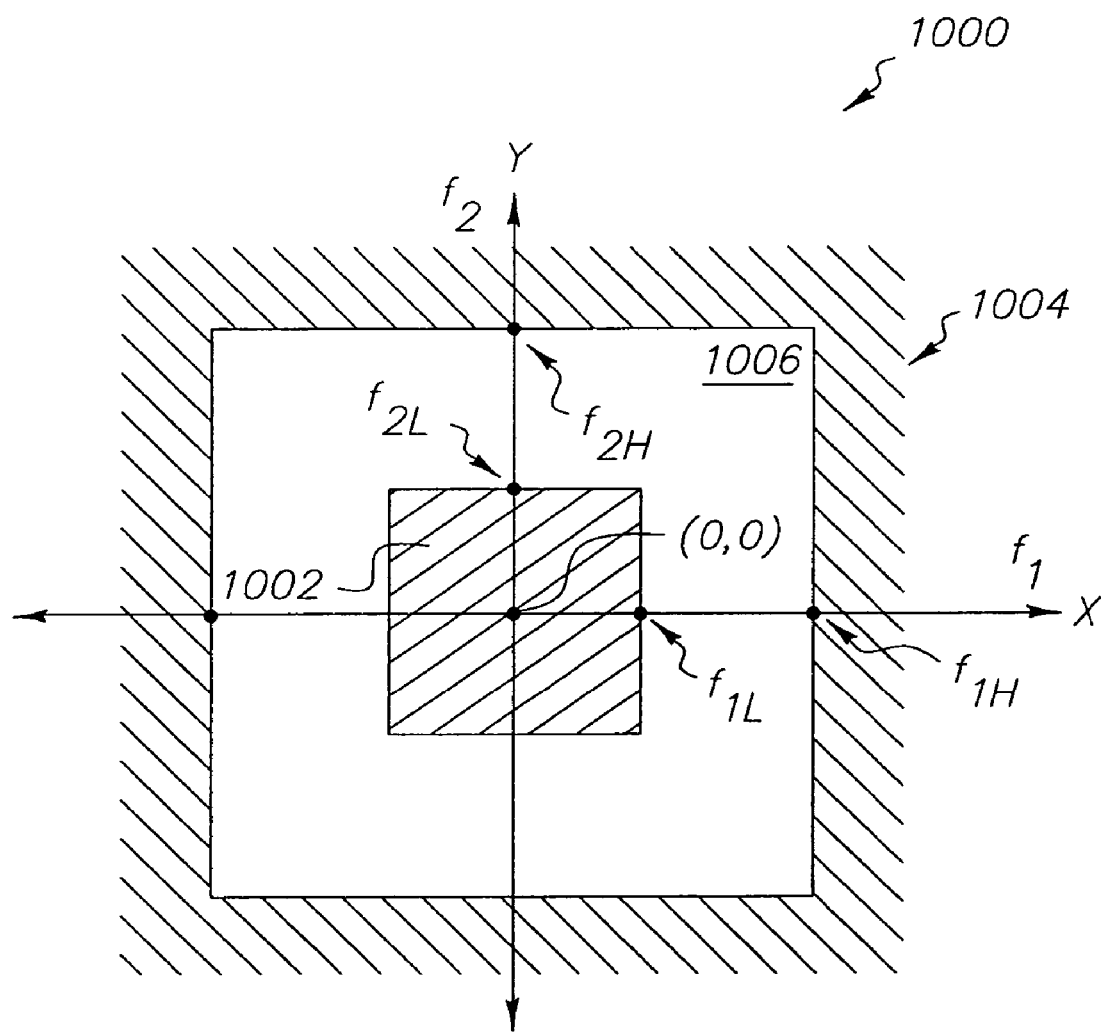
FIG. 10 shows a hypothetical two-dimensional transform space and the low- high- and middle-frequency regions.

FIG. 10 shows a hypothetical two-dimensional transform space 1000 and the low-, high-, and middle-frequency regions. Partitioning the two-dimensional spatial frequency space of the clear image plane in this manner gives rise to three distinct regions: a first, low frequency region 1002 below the first and second frequency thresholds in the associated dimensions; a second, high frequency region 1004 above the third and fourth thresholds in the associated same dimensions; and a third, middle frequency region 1006 between the first and third frequency thresholds in one dimension, and between the second and fourth frequency thresholds in the other dimension. A first approach to color correction may be employed if most of the texture energy ends up in the first region; a second approach to color correction may be employed if most of the texture energy ends up in the second region, and a third approach to color correction may be employed if most of the texture energy ends up in the third region. Thus, different approaches for correcting texture may be employed depending which two-dimensional spatial frequency region has the most energy. It is further understood that a clear toner image plane may be subdivided into a number of smaller sub-planes, each of which is subjected to a two-dimensional Fourier transform, resulting in the formation of the above-mentioned three regions for such sub-plane, and the subsequent application of one of the three approaches for each sub-plane.

Figure 11:
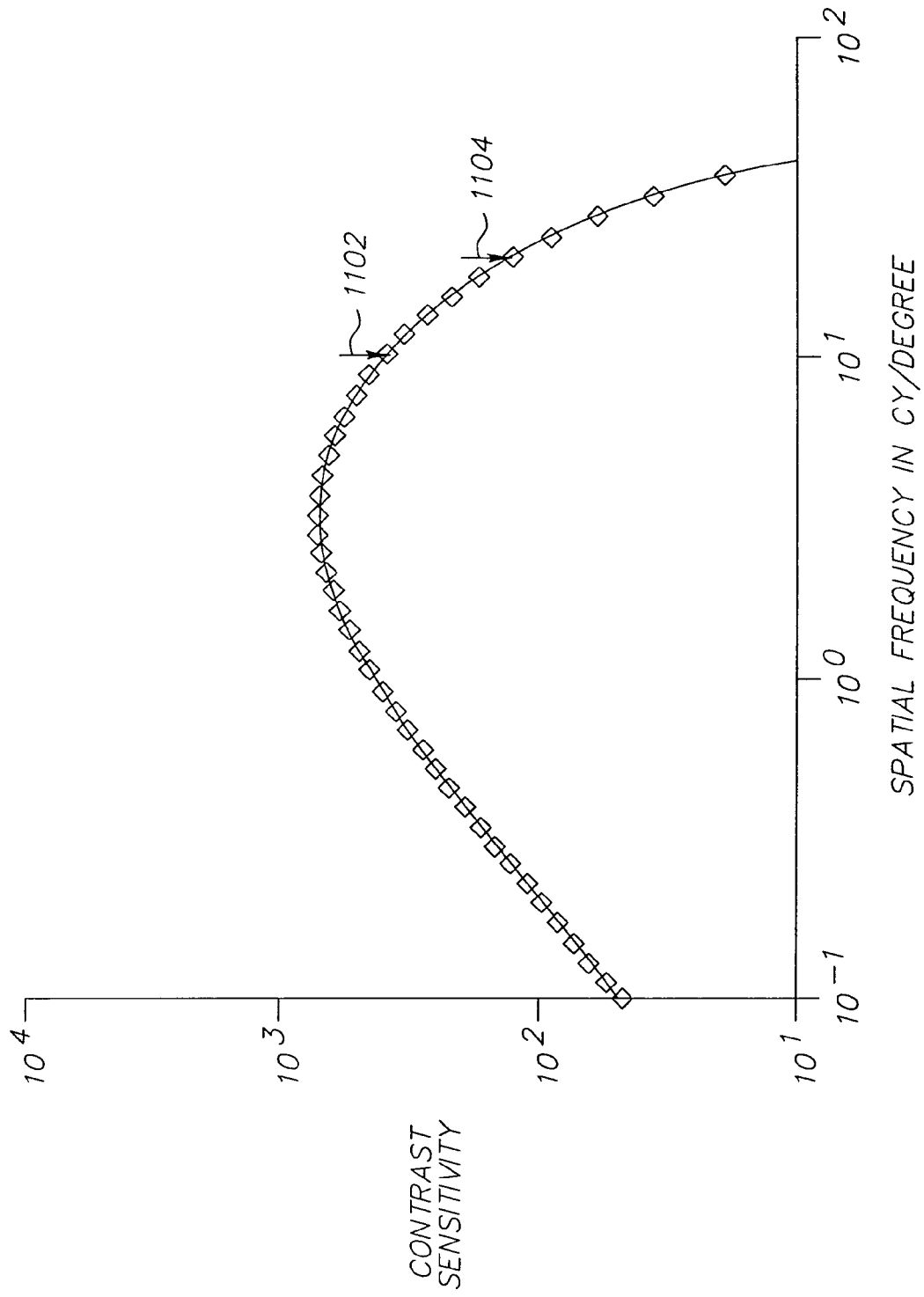
FIG. 11 illustrates the human contrast sensitivity curve.

The above-mentioned thresholds may be based on perception of imagery by the human eye. FIG. 11 is a curve of the "Contrast Sensitivity Model", which plots the human visual sensitivity in the y-axis vs. spatial frequency in cycles/degree in the x-axis. This particular curve is for light adaptation level of 50 cd/m², which is typical for bright illumination in the office. This curve is presented in, and further discussed in: Peter Barton, "Contrast Sensitivity of the Human Eye and its Effects on Image Quality", SPIE Press Monograph, Vol. PM72, 1999.

The two arrows point to specific points on the curve. A first arrow 1102 points to a first, lower spatial frequency on the curve at about 11.3 cycles/degree (in the eye), which is similar to ~65 lines/inch screen at a viewing distance of 10 inches. A second arrow 1104 points to a second, higher spatial frequency on the curve at about 23 cycles/degree (in the eye) which is similar to ~133 lines/inch screen at a viewing distance of 10 inches.

In a first region below the first, lower spatial frequency value of 65 lines/inch (~11.3 cycles/degree at 10" distance), due to the coarseness of the texture, the color difference between a first set of areas that have clear toner on top, as opposed to a second set of areas that do not have clear toner on top, is noticeable. A first approach may be used to handle color correction in this first region.

In a second region above the second, higher spatial frequency, the visual sensitivity is such that slight color changes are not noticeable. Therefore, at the higher spatial frequencies of this second region, a second approach may be used for color correction when using clear toner.

The visual sensitivity curve is for an "average" person viewing the image at a distance of about 10". However, there is considerable variation among individuals that are "non-average". Thus, some persons may perceive color and texture variations somewhat differently than others, or may prefer to view the images at distances either closer or further away than 10". The third, middle region between the first and second frequency values is where this variation among individuals is most pronounced. Therefore, in this third, middle region, a third approach calling for a human operator to decide best course of action is preferable. In one embodiment of this third approach, one of the first and second approaches is selected as the default and displayed as the preferred option to the operator. More preferably, the first approach, i.e., the approach utilized when the spatial frequency is low, is the default option.

The three approaches are now discussed. In all of these approaches, it is assumed that a colored image is to be created and that a clear toner is to be applied on top to form a three-dimensional texture. It should be kept in mind that texture information corresponding to the clear toner image plane need not be binary. In other words, the quantity of clear toner called for, on a pixel by pixel basis, need not only assume either 100% coverage or 0% coverage; it may call for intermediate "gray level" quantities, as well.

The first approach is used when the spatial frequency of the clear toner texture is low. In other words, the effect of the clear toner on color is visible. In an area of the colored image to be covered with a clear toner for three-dimensional texture, the color would change due to the application of the clear toner. For this approach, two color profiles are created. The first color profile is for 100% clear toner coverage on top, and the second color profile is for 0% clear toner coverage on top. On a pixel by pixel basis, proportional to the amount of coverage called for in the clear toner image plane, a third color profile is created, and this third color profile interpolates the values of the first and second color profiles. Thus, a blending operation of the two color profiles is used to create printing values. In a preferred embodiment, a linear interpolation of the two color profile values corresponding to a particular pixel is performed. It is understood, however, that some form of non-linear interpolation may be used instead.

The second approach is used when the spatial frequency of the clear toner texture is high. In other words, the effect of the clear toner on color is not very noticeable. In such case, only one color profile is needed for that textured image. One option here is to simply use the ICC color profile of the original system for all textures, i.e., the ICC color profile that assumes there is no clear toner. In such case, we simply accept the fact that the appearance of the colored image will change a bit since the absolute color will differ from the calibrated color. However, there will not be an observable color difference within a uniform color region, even though the color is not quite accurate. A second option is to build a new ICC color profile with that particular three-dimensional clear toner texture surface. In this manner, the macro "color accuracy" problem is corrected, while the color artifact from pixel-to-pixel is not noticeable. Furthermore, a library of such texture-modified ICC color profiles may be built up over time for use whenever an operator wishes to add a previously defined texture to a profile, as discussed above. A computer software application implementing such a system may, for the second approach, automatically invoke just one of these two options, or may instead display a choice of the two options to an operator, perhaps with one of the options being the default.

The third approach can be used when frequency analysis cannot take care of non-periodic textures, or, for instance, when an operator is adding a clear toner layer for a new three-dimensional texture 'on the fly' and is uncertain (either due to viewing distance effect, or eyesight sharpness difference) as to the impact of the clear toner on the underlying colors. In this third approach, the default option displayed on the monitor is to use the first approach, i.e., treat it as a low frequency image. However, the software application also displays the second approach as an alternative. The application accepts the operator's selection and executes the necessary step to implement it. If the operator chooses the second option, an additional menu may be provided, asking whether the operator wishes the switch to a previously defined texture for which an ICC color profile is already provided.

Figure 12:
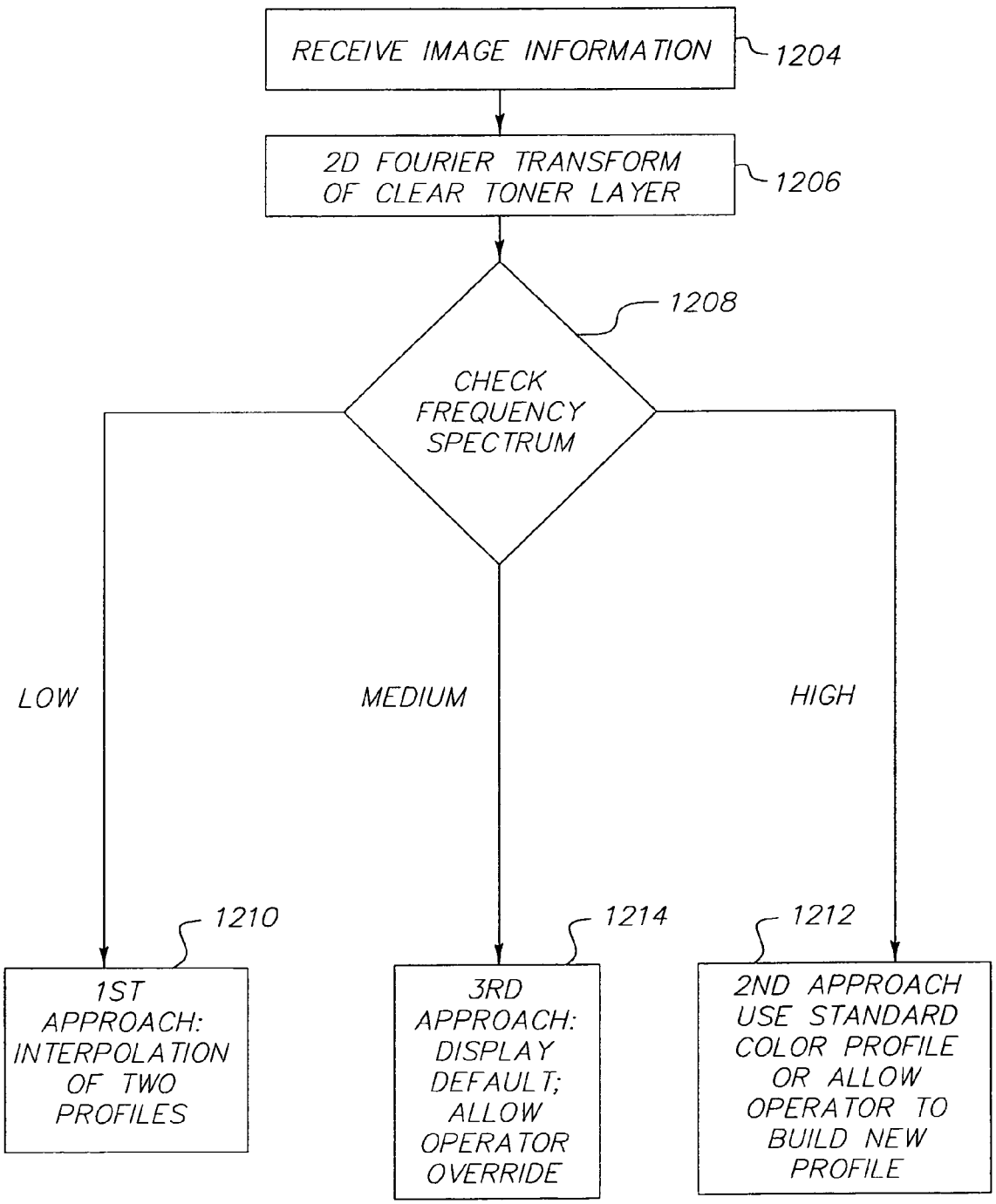
FIG. 12 presents flow chart illustrating steps of a software application implementing one embodiment of the present invention.

FIG. 12 presents a flowchart detailing the process flow for an application resident on a computer of a front-end station implementing the foregoing. In step 1204, the digital data comprising image information is received. In step 1206, a two-dimensional Fourier transform of the clear toner layer is taken. In step 1208, the frequency spectrum is checked. If the amount of spectral energy is greatest in the low frequency region, then at step 1210, the application may automatically implement the first approach. If the amount of spectral energy is greatest in the high frequency region, then at step 1212, the application may invoke the second approach. Finally, if the amount of spectral energy is greatest between the two regions, then at step 1214, the application initiates the third approach.

Figure 1A:
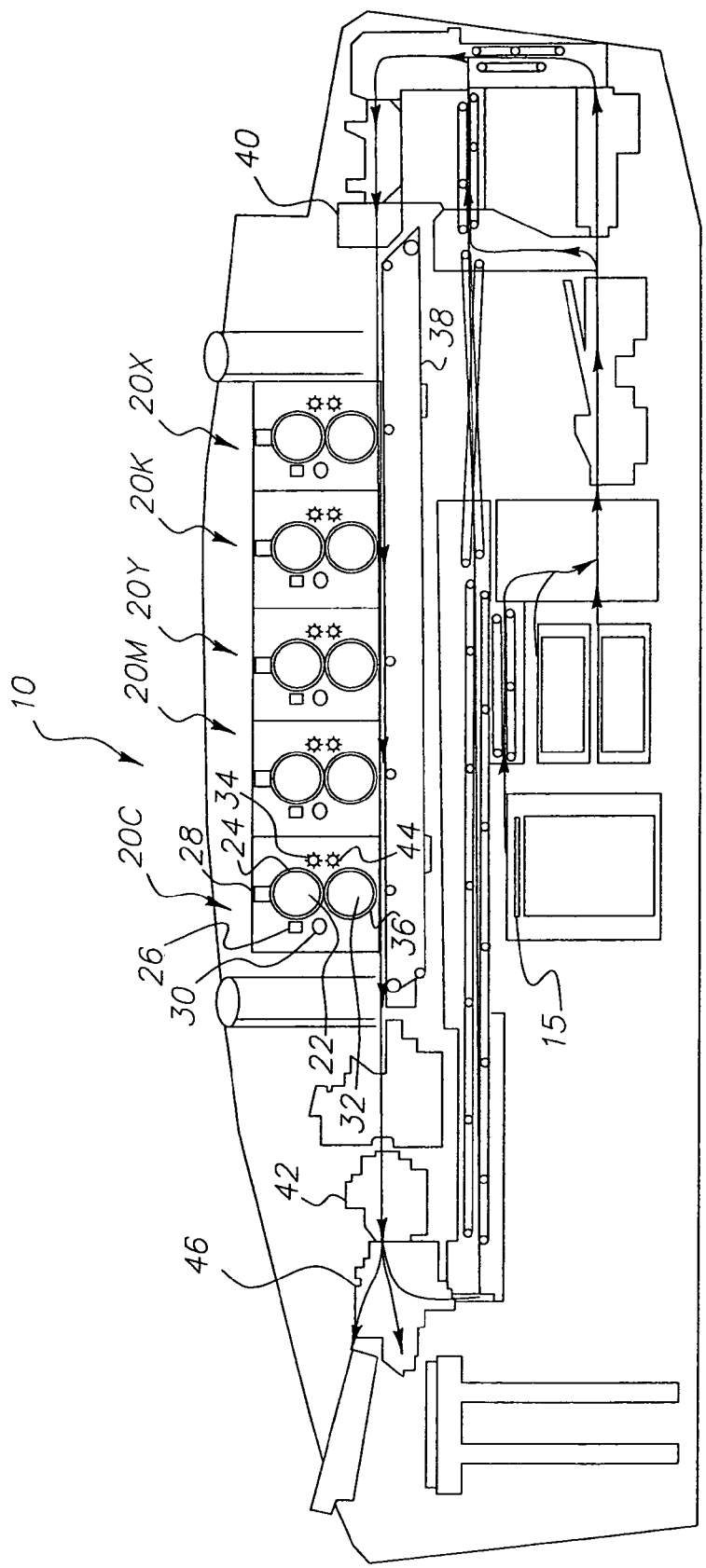
FIG. 1*a* shows a prior art electrophotographic (EP) printer with five imaging units.
Figure 1B:
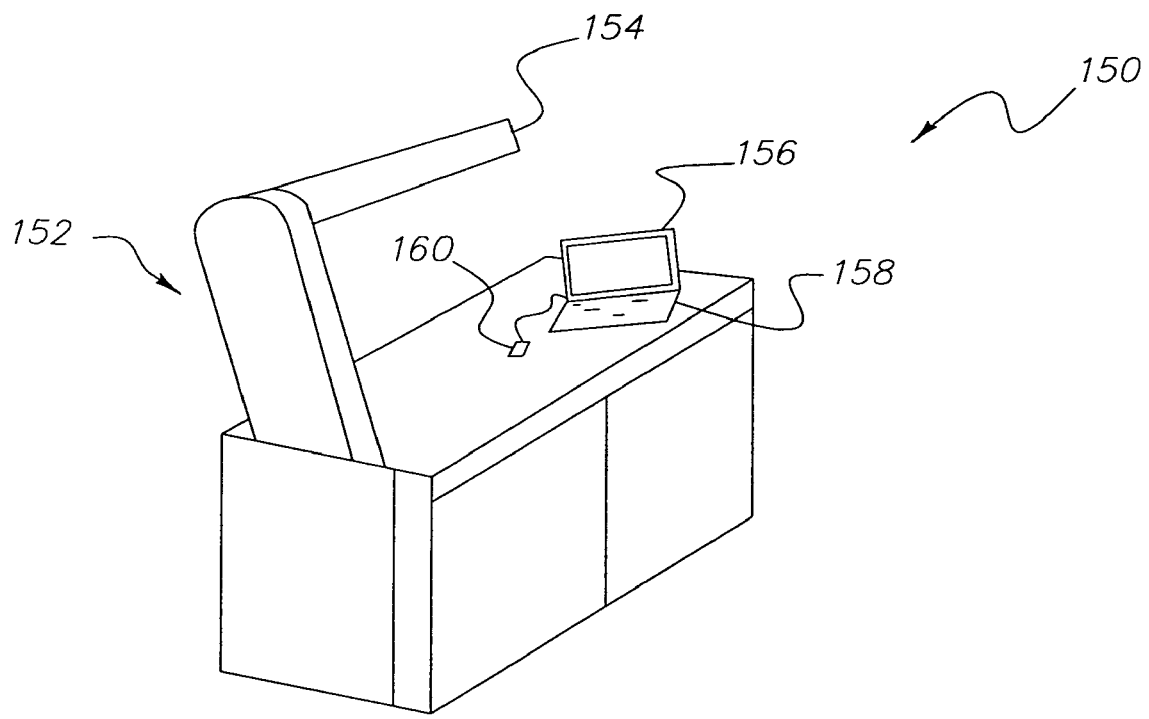
FIG. 1*b* shows a prior art front-end station for use with an electrophotographic (EP) printer.
Figure 2:
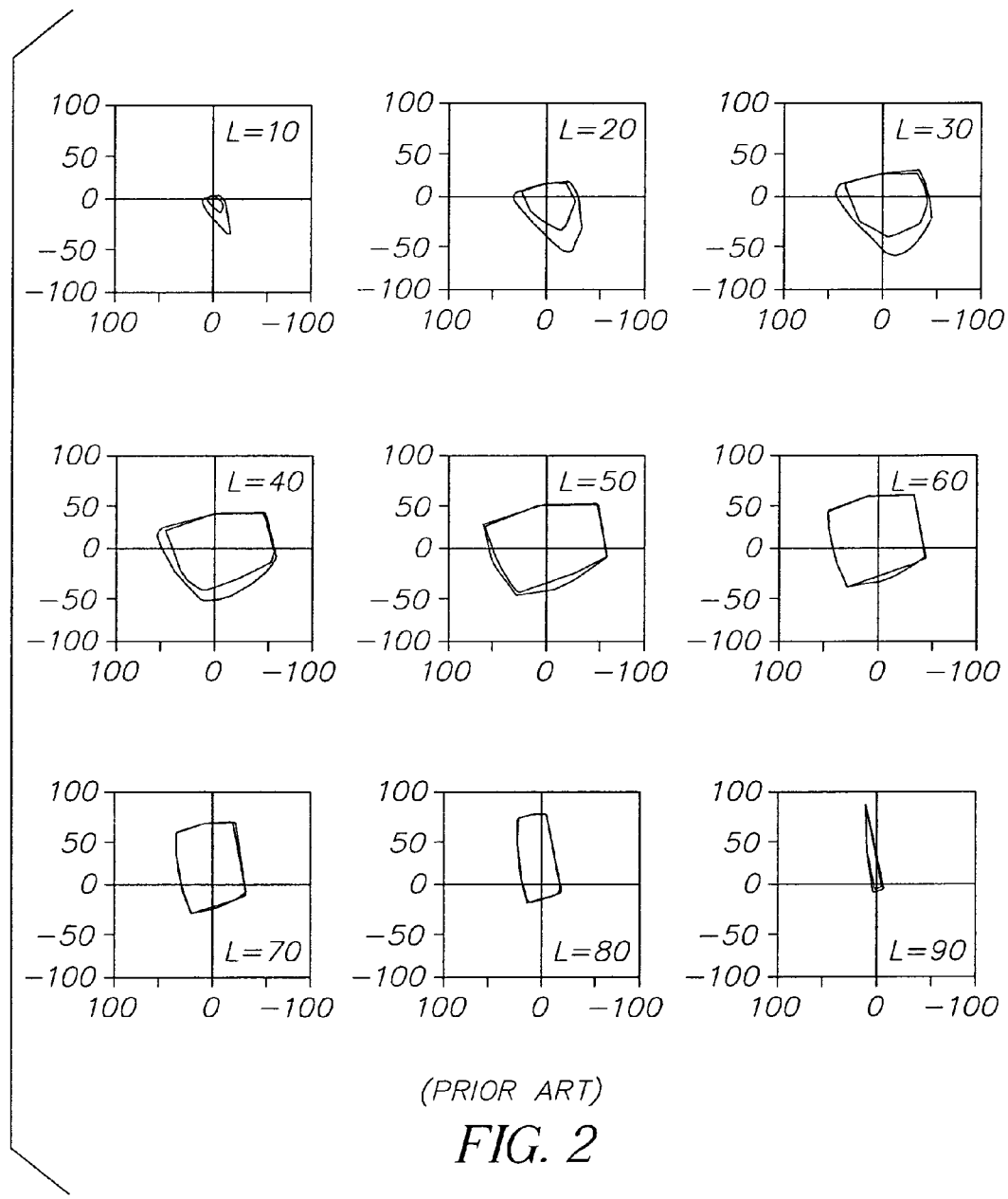
FIG. 2 illustrates a color gamut comparison for a color image, with and without the use of a transparent toner in accordance with an exemplary embodiment of the invention.
Figure 3:
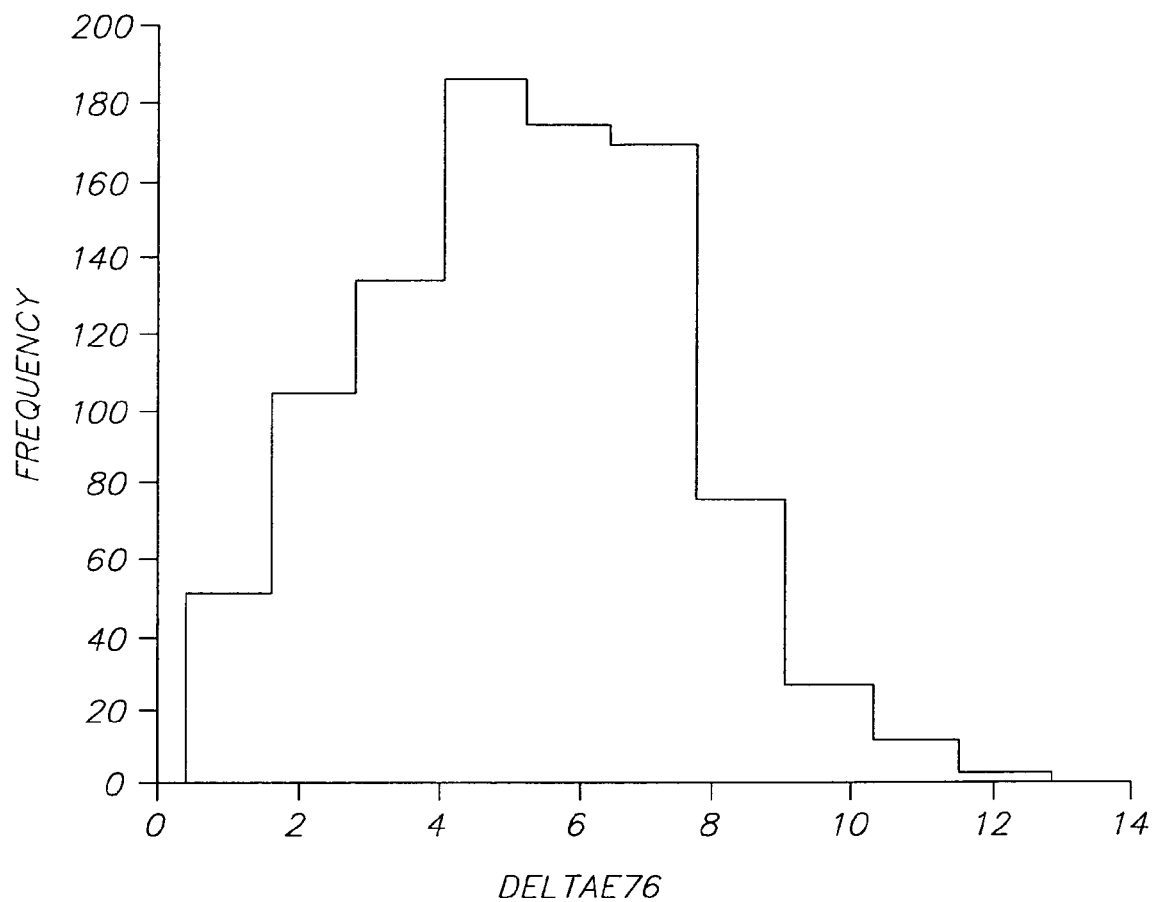
FIG. 3 illustrates a color error histogram of the in gamut color between a four-color process and a four-color process with transparent toner.
Figure 4:
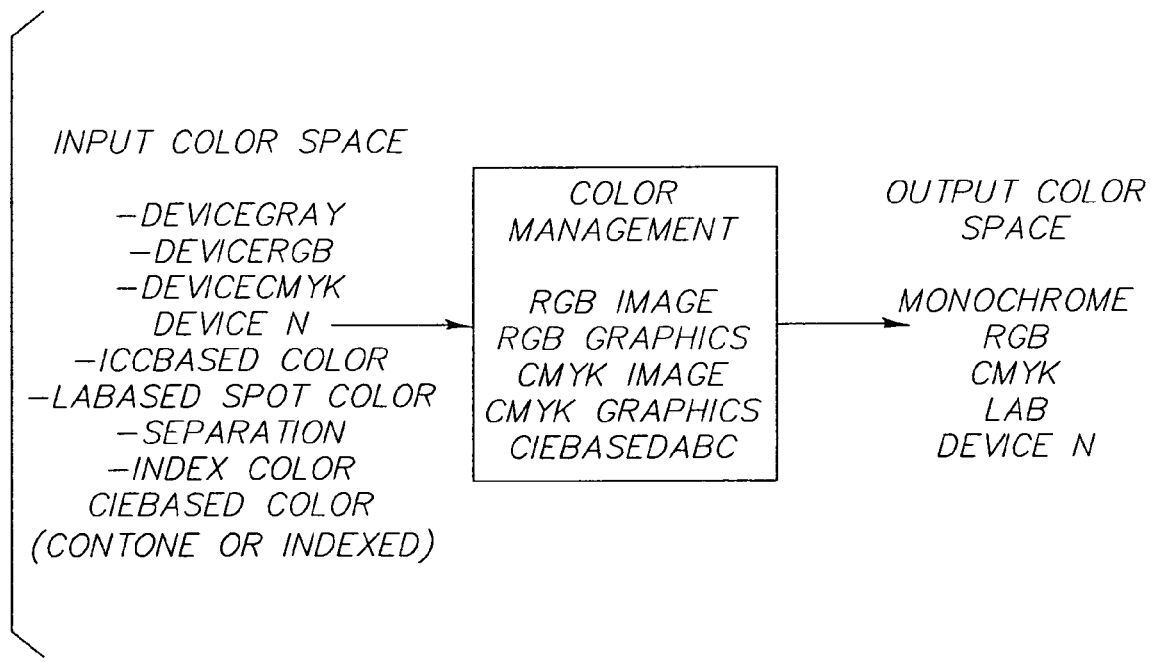
FIG. 4 illustrates a typical color management model for a printer in which the present invention can be utilized.
Figure 5:
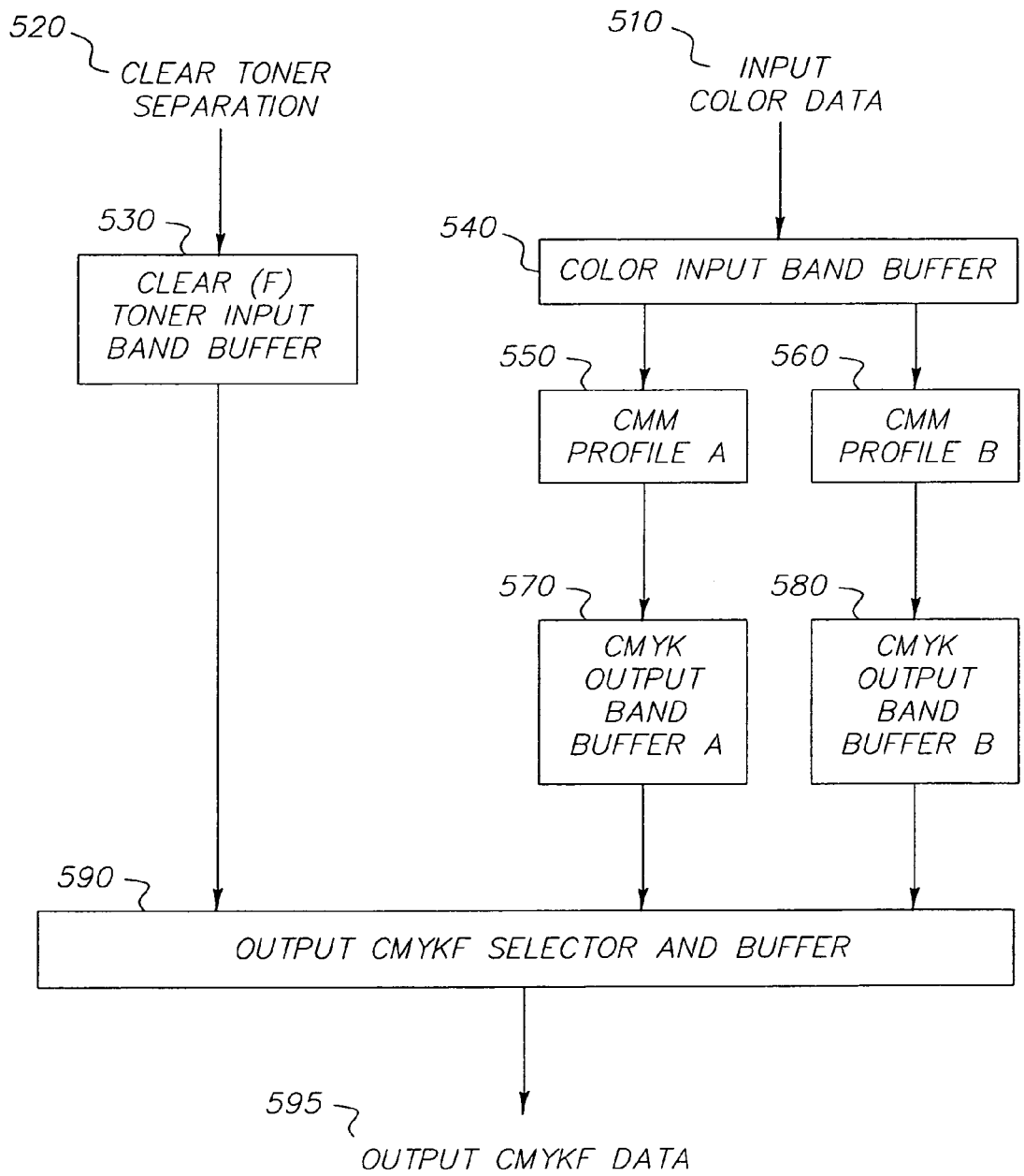
FIG. 5 illustrates band processing color correction with transparent toner image insignia in accordance with an exemplary embodiment of the invention.
Figure 6:
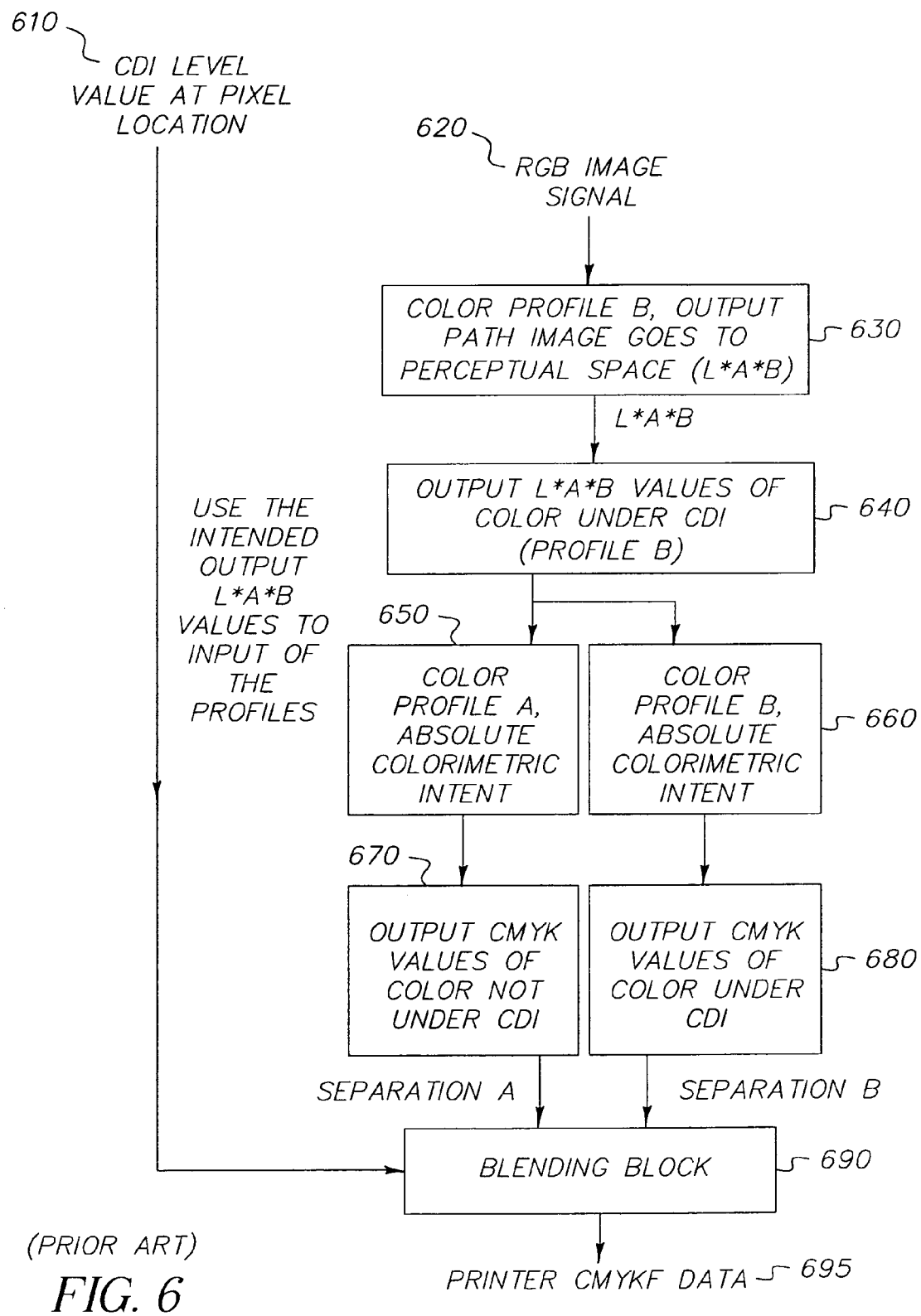
FIG. 6 illustrates band processing color correction for multiple color profiles on a per pixel basis in accordance with an exemplary embodiment of the invention.
Figure 7:
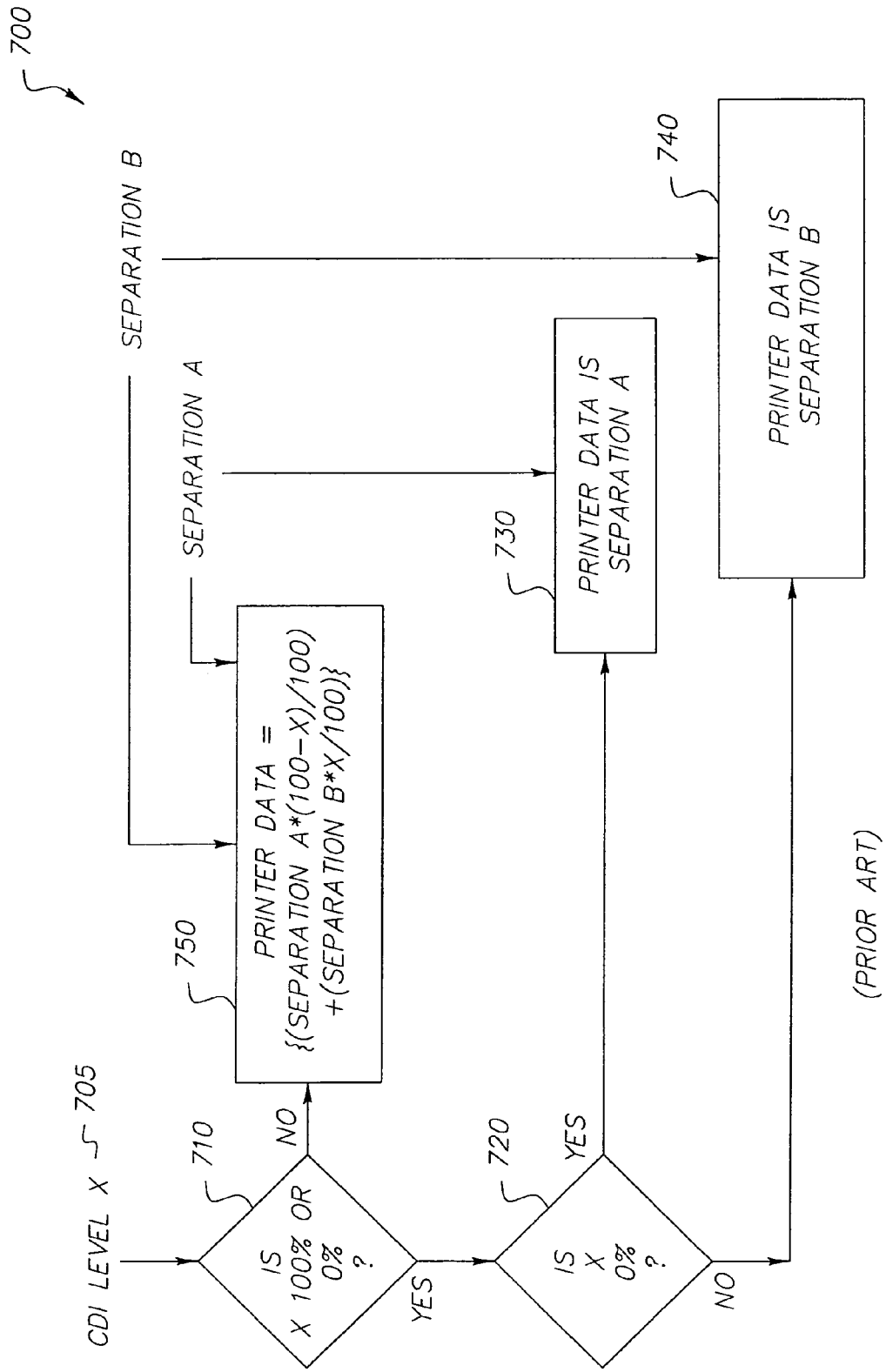
FIG. 7 illustrates an exemplary blending operation algorithm applicable to color correction with multiple color profiles.
Figure 8:
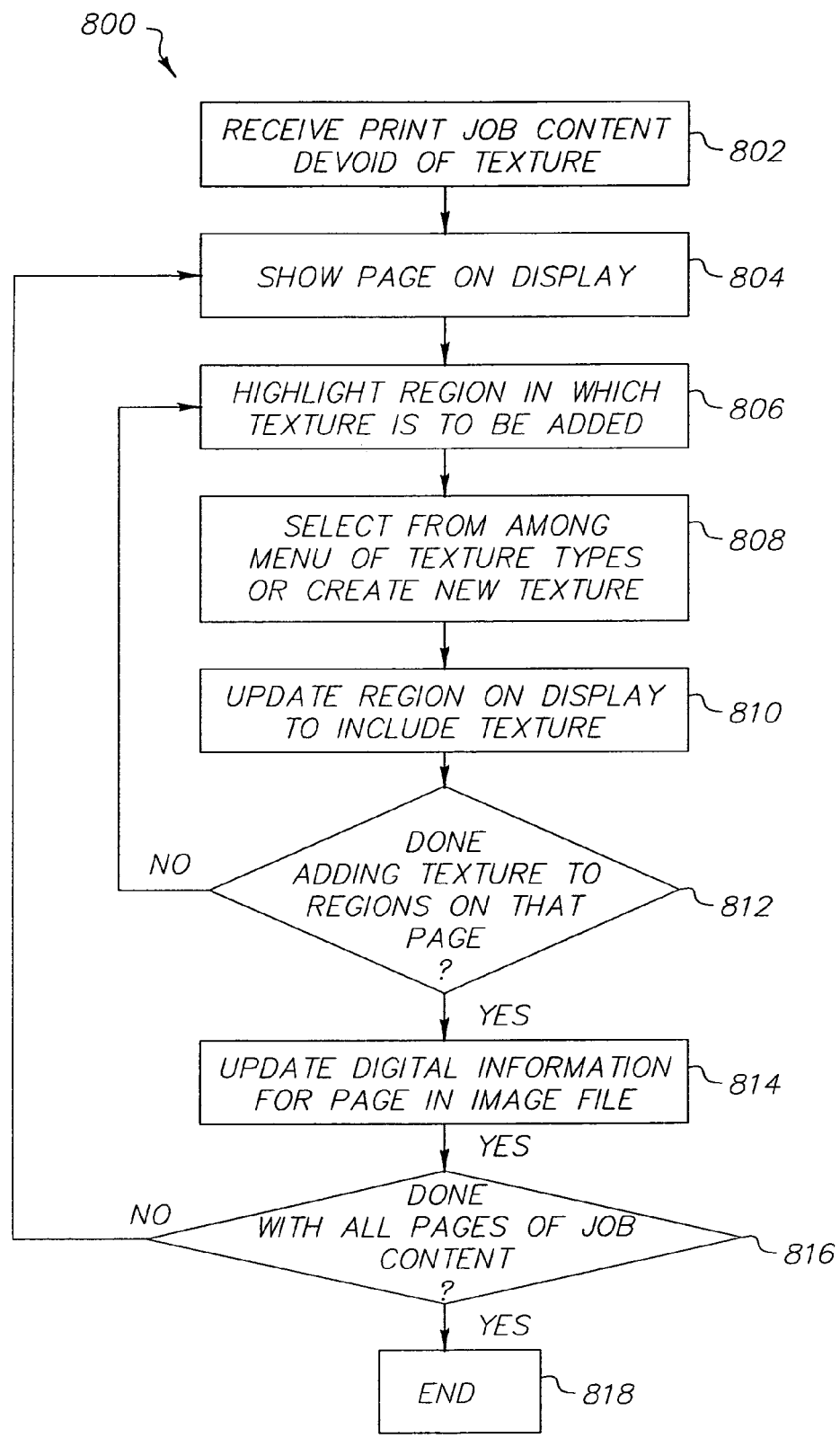
FIG. 8 illustrates the process of adding textural information to pages of print job content.
Figure 9:
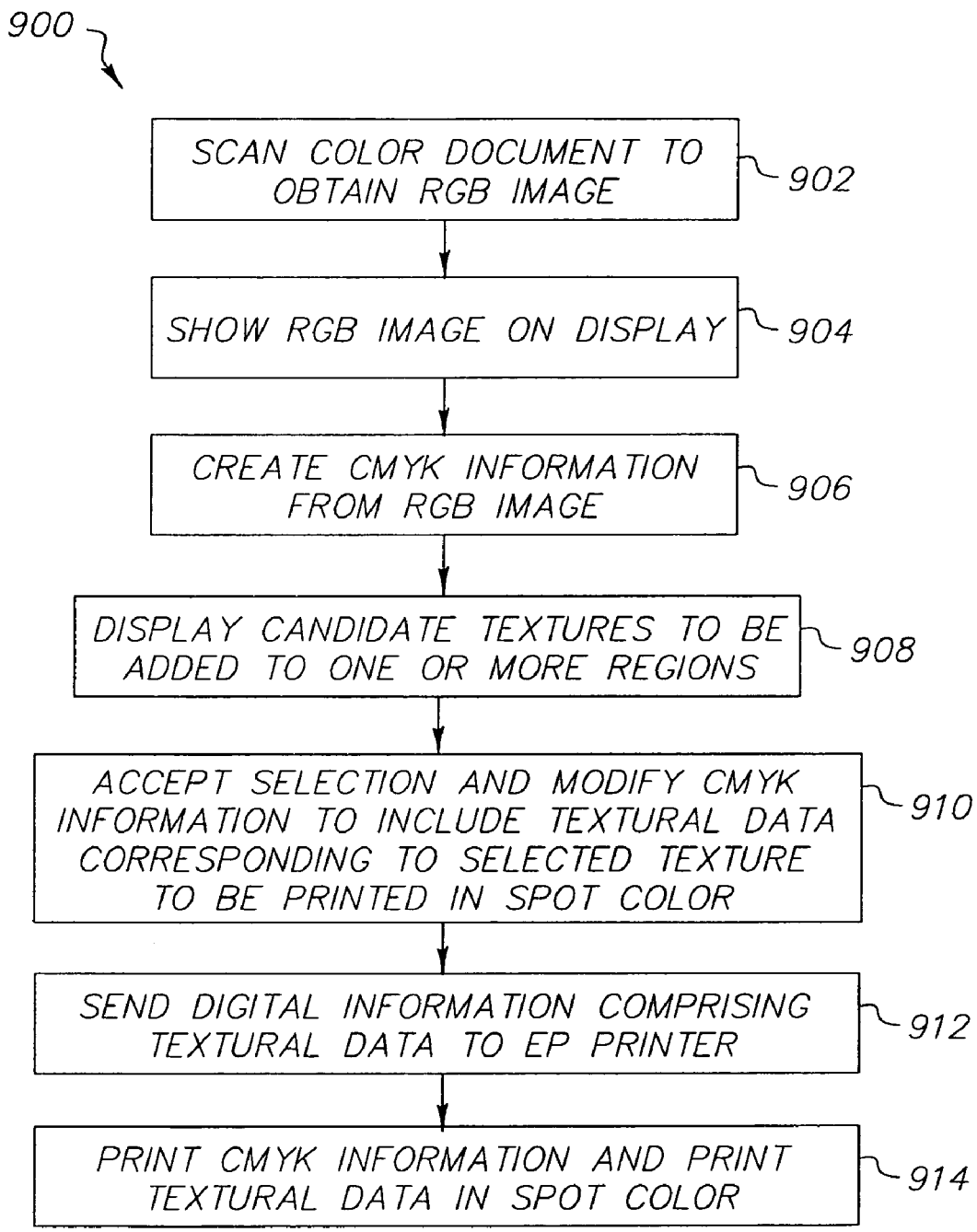
FIG. 9 illustrates the process of scanning a document and adding textural information.

It is understood that with appropriate software modifications, the prior art systems of FIGS. 1a and 1b can be modified to implement the present system. The software modifications may include applications to implement the necessary algorithms and logic, and may also include new or modified graphical user interfaces, menus, and the like. Such modifications are well within the ordinary still in the art of developing applications for such platforms.

Color matching of areas with and without clear toner may be somewhat complicated due to the impact of the clear toner on optical density, as affected by the saturation level of the colored areas. This leads to a tradeoff between color matching and saturation levels. A first color profile using less than the full output range ("short output range") for each color (i.e., less than 0-255, such as 0-220, though other maximum values are possible) may result in good color matching, even when clear toner is applied. A second color profile using the "full range" of 0-255, on the other hand, while having full saturation when no clear toner is present, may encounter some error in color due to the application of clear toner on top. In this second case, the area under the clear toner cannot reach the saturation level of the area without the clear toner, and so there will be some color error in those area. However, if that error can be accepted, one may be able to benefit from the higher color saturation of the areas without clear toner. In the context of the present invention, this means that one may selectively choose whether or to use "short range" or "full range" saturation during the formation of color profiles, depending on the frequency of the texture. At high spatial frequencies, one may simply ignore this error and use the full output range, while at lower spatial frequencies one may elect to use the short output range.

It will be understood by those skilled in the art that while the foregoing has been described with reference to preferred embodiments and features various modifications, variations, changes and additions can be made thereto without departing from the spirit and scope of the invention.

PARTS LIST

10 printer
15 paper
20 imaging unit
22 drum/roller
24 surface
26 changer
28 exposure device
30 toner development station
32 transfer drum
34 cleaning device
36 transfer surface
38 belt or web
40 corona charger
42 detack charger
44 cleaning devices
46 fusing device
150 front-end station
152 scanner
154 scanning head
156 display
158 keyboard
160 pointing device

The invention claimed is:

1. A method of mitigating change in image appearance due to planned application of a three-dimensional texture to a color image to be printed by an electrophotographic printer, the method comprising:

analyzing digital data of color information for forming an image, the digital data including first information corresponding to a plurality of color layers and second information corresponding to a clear toner layer, the second information sufficient to impart a three-dimensional texture to the image; and correcting a color profile for the electrophotographic printer based on a measure of a spatial frequency of said second information.

2. The method according to claim 1, wherein said correcting step comprises:

correcting the color profile for the image with a first approach, if the energy of the first information is predominantly at spatial frequencies less than a first threshold frequency;

correcting the color profile for the image with a second approach, if the energy of the first information is predominantly at spatial frequencies greater than a second threshold frequency that exceeds the first threshold frequency; and correcting the color profile for the image with a third approach, if the energy of the first information is predominantly at spatial frequencies between the first and second threshold frequencies.

3. The method according to claim 2, wherein the first and second threshold frequencies correspond to points along a human visual contrast sensitivity curve.

4. The method according to claim 2, wherein the first approach comprises interpolating between a first color profile and a second color profile, based on an amount of clear toner called for in said second information.

5. The method according to claim 4, wherein the first color profile corresponds to applying 100% clear toner coverage on top of color, and the second color profile corresponds to applying 0% clear toner coverage on top of color.

6. The method according to claim 4, comprising interpolating on a pixel-by-pixel basis.

7. The method according to claim 2, wherein the second approach comprises using a color profile that assumes no clear toner is to be applied on top of color.

8. The method according to claim 2, wherein the second approach comprises to building a new color profile based on said second information.

9. The method according to claim 2, wherein the third approach comprises:
  displaying a default option of interpolating between a first color profile and a second color profile, based on an amount of clear toner called for in said second information; and
  displaying at least one alternative option of using a color profile that assumes no clear toner is to be applied on top of color.

10. The method according to claim 2, wherein the third approach comprises:
  displaying a default option of interpolating between a first color profile and a second color profile, based on an amount of clear toner called for in said second information; and
  displaying at least one alternative option of building a new color profile based on the second information.

11. The method according to claim 1, further comprising:
  forming a color profile employing less than a full output range, based on said measure of a spatial frequency of said second information.

12. A method of mitigating change in image appearance due to planned application of a three-dimensional texture to a color image to be printed by an electrophotographic printer, the method comprising:
  receiving digital data of color information for forming an image, the digital data including first information corresponding to a plurality of color layers and second information corresponding to a clear toner layer, the second information sufficient to impart a three-dimensional texture to the image; and
  interpolating between a first color profile and a second color profile, based on an amount of clear toner called for in said second information.

13. The method according to claim 12, wherein the first color profile corresponds to applying 100% clear toner coverage on top of color, and the second color profile corresponds to applying 0% clear toner coverage on top of color.

14. The method according to claim 13, comprising interpolating on a pixel-by-pixel basis.

15. A method for operating an electrophotographic printing system having an electrophotographic printer and a computer used in conjunction therewith, said method comprising the steps of:
  loading on the computer software configured to mitigate change in image appearance due to planned application of a three-dimensional texture to a color image to be printed by said electrophotographic printer, the software including:
  analyzing digital data including color information for forming an image, the digital data including first information corresponding to a plurality of color layers and second information corresponding to a clear toner layer, the second information sufficient to impart a three-dimensional texture to the image; and
  correcting a color profile for the electrophotographic printer based on a measure of a spatial frequency of said second information.

16. The electrophotographic printing system, operating method according to claim 15, further including:
  correcting the color profile for the image with a first approach, if the energy of the first information is predominantly at spatial frequencies less than a first threshold frequency;
  correcting the color profile for the image with a second approach, if the energy of the first information is predominantly at spatial frequencies greater than a second threshold frequency that exceeds the first threshold frequency; and
  correcting the color profile for the image with a third approach, if the energy of the first information is predominantly at spatial frequencies between the first and second threshold frequencies.

17. The electrophotographic printing system, operating method according to claim 15, further including:
  interpolating between a first color profile and a second color profile, based on an amount of clear toner called for in said second information.

18. The electrophotographic printing system, operating method according to claim 15, further including:
  building a new color profile based on said second information.

19. The electrophotographic printing system, operating method according to claim 15, further including:
  displaying a default option of interpolating between a first color profile and a second color profile, based on an amount of clear toner called for in said second information; and
  displaying at least one alternative option of using a color profile that assumes no clear toner is to be applied on top of color.

20. The electrophotographic printing system, operating method according to claim 15, further including:
  forming a color profile employing less than a full output range, based on said measure of a spatial frequency of said second information.

* * * * *